Dec. 15, 1953  C. H. RODEBACK  2,662,622
AUTOMATIC BRAKE AND ACCELERATOR COORDINATING DEVICE
Filed July 9, 1951
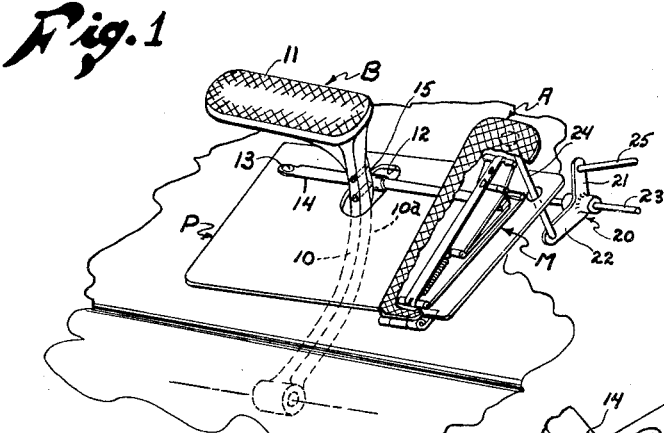
Fig. 1
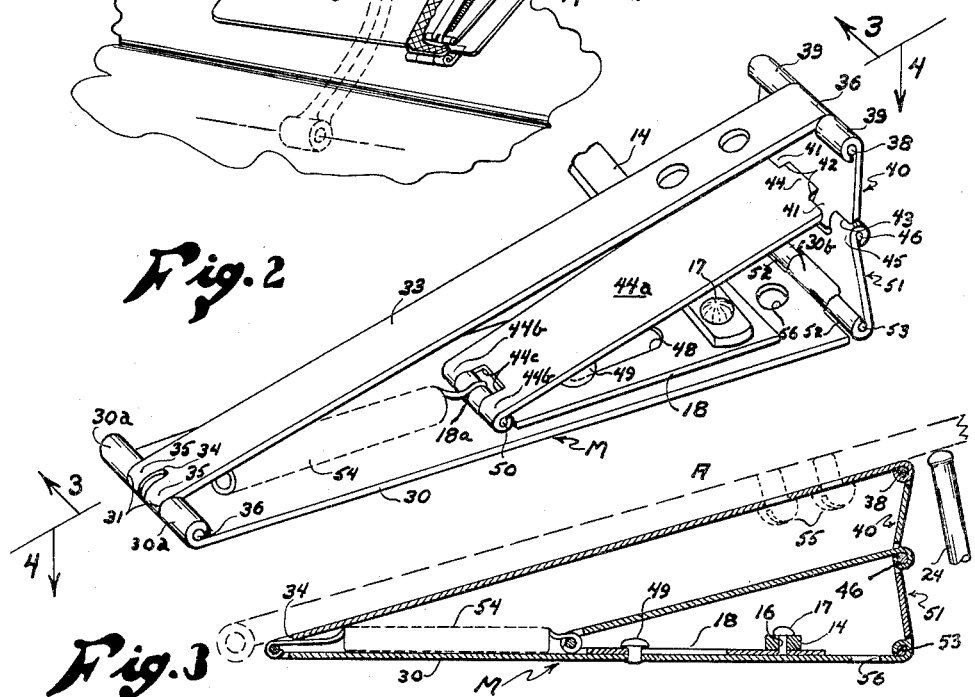
Fig. 2
Fig. 3
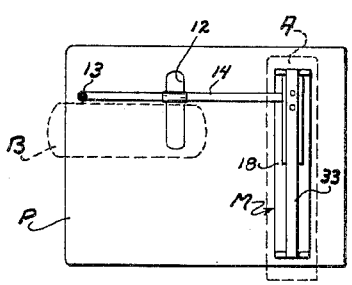
Fig. 4
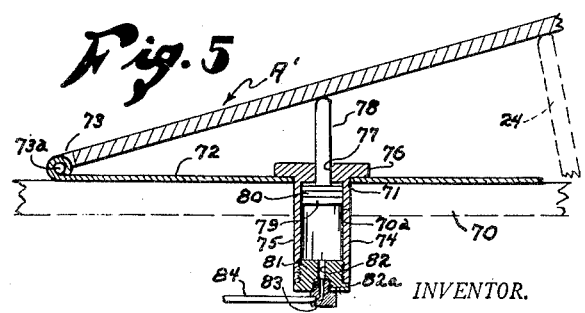
Fig. 5
INVENTOR.
CHARLES HOWARD RODEBACK
BY
Fulwider and Mattingly
ATTORNEYS.

Patented Dec. 15, 1953

2,662,622

UNITED STATES PATENT OFFICE 2,662,622

AUTOMATIC BRAKE AND ACCELERATOR COORDINATING DEVICE

Charles Howard Rodeback, San Pedro, Calif.

Application July 9, 1951, Serial No. 235,736

8 Claims. (Cl. 192—3)

The present invention relates to an accessory for power vehicles equipped with automatic transmissions, and more particularly to a mechanism that coordinates the action of the accelerator which is operated by the right foot, and the brake that is more easily and effectively operated by the left foot.

The automatic transmission of the present day automobile is so constructed that the vehicle is motivated when the engine is accelerated above idling speed. It is a common tendency amongst drivers of vehicles so equipped, particularly after using manually operated gear shifts for years, to subconsciously step on the accelerator of the vehicle for a quick "get-away." Of course, when the present day engine is so accelerated the vehicle is put into motion and the driver must immediately apply the brake to restrain such motion until the traffic starts to move once again. Such acceleration of the engine and braking of the vehicle provide two forces working in opposition, with the result that the driving mechanism becomes overheated. Overheating of the transmission is not only detrimental, but due to such treatment may become completely inoperative.

The primary purpose in devising the present invention is to provide a device that coordinates the action of the accelerator and brake in a power vehicle to prevent undue wear and overheating of the automatic transmission.

A primary object of the invention is to supply an accelerator and brake coordinating device that may be installed as standard equipment on a power vehicle, or may be mounted on an existing vehicle as an accessory by a person of limited mechanical ability.

Another object of the invention is to furnish a device that has an extremely simple mechanical structure, may be fabricated from standard commercially available material, is simple to operate, and requires a minimum of maintenance attention.

Yet another object of the invention is to provide a device that prevents inadvertent abuse of an automatic transmission by a driver of a vehicle with no knowledge of the mechanical relationship between the brake and accelerator.

A still further object of the invention is to minimize the maintenance costs on an automatic transmission by preventing overheating thereof.

These and other objects and advantages of the invention will become apparent from the following description of the preferred and an alternate form thereof, and from the drawing illustrating those forms in which:

Figure 1 is a perspective view of the device as installed in a power vehicle;

Figure 2 is a perspective view of the mechanism that prevents movement of the accelerator when the brake pedal is in an actuating position;

Figure 3 is a vertical cross-sectional view of the mechanism shown in Figure 2, taken on the line 3—3 thereof;

Figure 4 is a plan view of the device taken on the line 4—4 of Figure 2; and,

Figure 5 is a vertical cross-sectional view of an alternate form of the invention.

Referring now to Figures 1 and 2 for the general arrangement of the invention, it will be seen that it includes a substantially rectangular base plate P through which the brake pedal B extends. The base plate P supports a mechanism M which prevents concurrent actuation of the brake pedal B and accelerator pedal A.

Normally the brake pedal B of a power vehicle is formed from an upwardly and forwardly extending curved member 10 that is pivotally supported from a mounting (not shown). The brakes of the vehicle are actuated when pressure is applied to a transversely postioned plate 11 mounted on the upper end of the member to move the member 10 forwardly.

As seen in Figure 1, member 10 extends upwardly through a vertically positioned slot 12 formed in base plate P. A rod 14 of a rigid material is positioned transversely to the member 10, and pivotally supported on the base plate P by a pin 13 that extends upwardly therefrom to engage an opening formed in one of the end portions of the rod. Rod 14 is so positioned on base plate P that the forward edge 10a of the brake member, or the corresponding edge of a curved cam 15 that may be mounted on the member, are not in contact with the rod when the brake pedal B is in its normal unactuated position. However, when the brake pedal B is depressed, member 10 pivots forwardly, and the edge 10a or the corresponding edge of cam 15 is brought into contact with rod 14 to cause an upward pivoting movement thereof.

Rod 14 has a downwardly extending bore 16 formed in the end thereof adjacent the mechanism M, which bore is engaged by a rivet or pin 17 rigidly affixed to an elongated slidable member 18 as may best be seen in Figure 3. As the brake pedal B is pivoted upwardly and downwardly, member 18 is moved to cause actuation of the mechanism M, as will hereinafter be explained in detail.

Normally the accelerator A includes a bell crank 20 (Figure 1) that has an upwardly extending leg 21 and a downwardly and rearwardly extending leg 22. The bell crank 20 is pivotally mounted on a suitable shaft or pin 23 affixed to a convenient part of the vehicle. The rearward end of leg 22 is pivotally connected to an upward extending rigid rod 24 that engages the lower surface of the accelerator pedal A, as may be seen in Figure 3. A rod 25 is pivotally connected to the upper end of leg 21 and extends forwardly to a suitable movable member (not shown) on the carburetor of the vehicle. Thus, as the accelerator pedal A is depressed, the bell crank 20 is pivoted on support 23, and the rod 25 actuates the carburetor of the vehicle to feed an increasing fuel supply to the engine to cause the acceleration thereof.

The mechanical details of the accelerator control mechanism M may best be seen in Figures 2 and 3. An elongated rectangular supporting member 30 is provided, the rearward end portion of which has two laterally spaced legs 30a creating a centrally disposed recess 31 between the inner edges thereof. The forward end portion of supporting member 30 is so formed as to provide a single centrally disposed leg 30b. Each of the legs 30a and 30b is curved or bent to have the free ends thereof situated adjacent to or in contact with member 30.

An elongated strip 33 of a rigid material is provided, narrower in width than recess 31 formed between the members 30a. The rearward end portion of member 33 has a centrally disposed longitudinally extending slot 34 formed therein that provides two legs 35 of hook shape. A transversely positioned pin 36 engages legs 30a and 35 to pivotally support strip 33 from member 30, as may best be seen in Figure 2. The forward end portion of strip 33 is bent downwardly into a curved portion 36 that pivotally engages a transversely positioned pin 38 supported by two curved laterally spaced segments 39. Members 39 are formed from the upper end portion of a rigid member 40, as seen in Figures 2 and 3. The lower end of member 40 has two laterally spaced pin-engaging members 41 depending therefrom that have a recess 42 formed therebetween, with spaces 43 on the outer sides thereof. A curved member 44 of slightly narrower width than recess 42 extends inwardly within the confines thereof, while the spaces 43 have curved members 45 positioned therein. A transversely positioned pin 46 extends through curved members 45, pin-engaging members 41, and member 44 to pivotally connect them, as may best be seen in Figure 2.

Member 44 is formed on the forward end of an elongated link 44a of rigid material that has two laterally spaced curved legs 44b formed on the rearward end thereof. Legs 44b are separated by a space 44c. A slidable plate 18 of generally rectangular shape is mounted on the upper surface of supporting member 30. Plate 18 has a longitudinally extending slot 48 formed therein that is engaged by a pin 49 extending upwardly from supporting member 30.

Plate 18 has an upwardly extending leg 18a formed on the rearward end thereof that is disposed in space 44c. The plate 18 and link 44a are pivotally connected by a pin 50 extending through legs 44b and leg 18a, as may best be seen in Figure 2. Curved members 45 are formed on the upper end portion of a rigid member 51 that has two laterally spaced pin-engaging members 52 formed on the lower end thereof and positioned on each side of leg 30b. A pin 53 pivotally engages members 52 and leg 30b to movably connect supporting member 30 and member 51. A helical spring 54 is longitudinally positioned on supporting member 30, with the ends thereof connected by conventional means to pins 36 and 50.

The accelerator pedal A, as may best be seen in Figure 3, is connected by screws 55 (shown in phantom line) to member 33. The supporting member 30 is affixed to the upper surface of the plate P by bolts, screws or rivets that pass downwardly through opening 56 formed in the member 30 to engage the plate.

The use and operation of the above described invention is extremely simple. It is, of course, first installed in a motor vehicle by affixing the base plate P to the floor board thereof, by conventional means such as screws or bolts. The forward surface 10a of the brake pedal B or the cam 15 mounted thereon, recedes somewhat rearwardly from the rod 14 so as to permit actuation of accelerator pedal A to fully accelerate the motor vehicle, without rod 14 coming into contact with the brake member edge or cam. Thus with brake B in its normal position, the vehicle can be accelerated by use of pedal A in a conventional manner. However, when the brake B is actuated member 10 moves forwardly to come into contact with rod 14 which is pivoted upwardly to advance plate 18 and link 44a pivotally supported thereon, into a position where pins 38, 46 and 53 are disposed in the same vertical plane and members 40 and 51 are in substantial alignment. With members 40 and 51 in the same vertical plane accelerator A cannot be actuated as there is no pivoting action on pin 46 between said members. However, when brake B returns to its normal position, the spring 54, which is at all times in tension, moves plate 18 rearwardly on supporting member 30. Such movement permits members 40 and 51 to assume an angular position relative to one another (Figure 1) in which they may pivot on pin 46. The accelerator pedal A may now be used in a conventional manner without the brake member 10 interfering with pivotal movement of rod 14. Rod 14 must always pivot on pin 13 when the accelerator pedal A is depressed or raised. Thus it will be seen that the invention above described permits acceleration in a conventional manner by accelerator A, but prevents acceleration when brake B is depressed due to engagement by the forward edge 10a of member 10 or cam 15 mounted therewith on rod 14. Cam 15 need be mounted on brake member 10 only when this member, due to its shape, does not provide sufficient forward throw when actuated to move rod 14.

Although the above described form of the invention has been found from experience to operate satisfactorily, it is also possible to accomplish the same results by hydraulic means as shown in Figure 5. The floor board of a vehicle 70 has an opening 70a formed therein which is in alignment with a bore 71 formed in an elongated base member 72. Base member 72 is supported by floor board 70 and affixed by conventional means (not shown). The rearward portion of the base member 72 is formed into upwardly extending curved legs 73 through which a pin 73a extends to pivotally support the pedal A' of an accelerator.

A hydraulic cylinder 74 is provided which extends downwardly through bore 71 and opening 70a. Hydraulic cylinder 74 includes a cylindrical shell 75 formed with a flanged end portion 76 affixed to the upper surface of member 72, as may best be seen in Figure 5, and has a centrally disposed bore 77 formed therein through which a piston rod 78 extends. The upper end of rod 78 engages the lower surface of accelerator pedal A'. The lower end of rod 78 is connected to the upper surface of a piston 79 that has a circumferentially extending groove formed therein in which an O-ring 80 is positioned to seal with the side walls of cylinder 75. The lower end of cylinder 74 is tapped and engaged by a threaded plug 81 that has a bore 82 extending upwardly therein to communicate with the interior of the cylinder. A conventional T fitting or angle 83 is threaded into a tapped bore 82a in plug 81 in communication with bore 82, and has a tube 84 leading therefrom which is connected to the master brake cylinder (not shown).

When the brake is not actuated the accelerator pedal A' can be pivoted upwardly or downwardly on pin 73a, with fluid in the cylinder 74 being discharged back to the master brake cylinder through the tube 84. However, upon actuation of the brake, fluid is discharged from the master cylinder into tube 84 where it flows into the confines of cylinder 74 to force piston 79 upwardly (Figure 5) with the rod 78 then holding the accelerator pedal A' in the idling position. The accelerator pedal A' cannot be depressed until the brakes are released to permit fluid in cylinder 74 to be discharged back to the master cylinder as the piston 79 is moved downwardly. Downward movement of piston 79 only takes place when accelerator pedal A' is pivoted downwardly. Pedal A' is held in the idling position by spring means (not shown) associated with the accelerator control rod 24.

Although the preferred and alternate forms of the invention herein disclosed are fully capable of providing the advantages and achieving the objects hereinbefore mentioned, it is to be understood that they are merely illustrative of the presently preferred embodiments of the invention, and that the invention is not to be limited to the details of construction herein shown other than as defined by the appended claims.

The invention claimed is:

1. A brake and accelerator coordinating device for a vehicle powered with an internal combustion engine having a brake pedal and accelerator which includes: an elongated rigid member; means to pivotally support said member in a position to be moved by the downward movement of said brake pedal; movable means which when actuated lock said accelerator in an idling position; and means operatively associated with said member which actuate said movable means when said brake pedal is depressed.

2. A brake and accelerator coordinating device for use in an internal combustion engine powered vehicle having a brake pedal and an accelerator pedal that extend through the floor board thereof which includes: a base plate having a slot formed therein through which said brake pedal may extend when said plate is mounted on said floor board; an elongated member; means to pivotally support said member on said plate whereby said member is moved by the downward movement of said brake pedal; movable means which when actuated lock said accelerator in an idling position; and means operatively associated with said member which actuate said movable means when said brake pedal is depressed.

3. A brake and accelerator coordinating device for use in an internal combustion engine powered vehicle having a brake pedal and an accelerator pedal that extend through the floor board thereof which includes: a base plate having a slot formed therein through which said brake pedal may extend when said is mounted on said floor board; an elongated member; means to pivotally support said member on said plate whereby said member is pivotally moved by the downward movement of said brake pedal; a vertically movable member mounted on said base plate, with said member when in its most upwardly extended position contacting the under side of said accelerator pedal to prevent its downward movement when said accelerator pedal is in an idling position; and means operatively connecting said elongated member to said movable member whereby movement of said elongated member raises said movable member to said extended position.

4. A brake and accelerator coordinating device for use in an internal combustion engine powered vehicle having a brake pedal and an accelerator pedal that extend through the floor board thereof which includes: a base plate having a slot formed therein through which said brake pedal may extend when said plate is mounted on said floor board; an elongated member; means to pivotally support said member on said plate whereby said member is pivotally moved by the downward movement of said brake pedal; means pivotally supported from said base plate that may pivot in a vertical plane, with said means when in its top vertical position contacting the under side of said accelerator pedal to prevent downward movement thereof; and means operatively connecting said elongated member and said pivotally supported means whereby said pivotally supported means is placed in said top position when said elongated member is moved by downward movement of said brake pedal.

5. A brake and accelerator coordinating device for use in an internal combustion engine powered vehicle having a brake pedal and an accelerator pedal that extend through the floor board thereof which includes: a base plate having a slot formed therein through which said brake pedal may extend when said plate is mounted on said floor board; an elongated member; means to pivotally support said member on said plate whereby said member is pivotally moved by the downward movement of said brake pedal; means pivotally supported from said base plate that may pivot in a vertical plane, with said means when in its top vertical position contacting the under side of said accelerator pedal to prevent downward movement thereof; means operatively connecting said elongated member and said pivotally supported means whereby said pivotally supported means is placed in said top position when said elongated member is moved by downward movement of said brake pedal; and spring means that returns said pivotally supported means to a non-interfering position with said accelerator pedal when said brake pedal returns to a non-braking position.

6. A brake and accelerator coordinating device for an internal combustion engine powered vehicle having a brake pedal and an accelerator pedal that extend through the floor board thereof which includes: a base plate having a slot formed therein through which the brake pedal may extend when said plate is mounted on said floor board; a rod; means pivotally supporting said rod on said base plate in a position whereby said rod is moved by the downward movement of said brake pedal; an elongated member pivotally supported on said base plate and positioned under and in vertical alignment with said accelerator pedal; two hinged members, with one of said members pivotally connected to said elongated member and the other of said hinged members pivotally connected to said base plate, and said hinged members when in the same plane preventing the downward movement of said accelerator pedal; a slidable member mounted on the upper surface of said base plate under said elongated member; means pivotally connecting said rod to said slidable member; a rigid link pivotally connected on its ends to said slidable member and said hinged members; and spring means that are at all times in tension connected to said base plate and said slidable member to return said rod, slidable member and hinged members to a position where said accelerator pedal may be freely used when said brake pedal is in a non-actuated position.

7. A brake and accelerator coordinating device for an internal combustion engine powered vehicle having a brake pedal and an accelerator pedal that extend through the floor board thereof which includes: a base plate having a slot formed therein through which said brake pedal extends when said plate is mounted on said floor board; a cam mounted on said brake pedal; a rod; means pivotally supporting said rod on said base plate in a position whereby said cam contacts and moves said rod when said brake pedal is depressed; an elongated rigid member pivotally supported on said base plate and positioned under and in vertical alignment with said accelerator pedal; two hinged members, with one of said members pivotally connected to said elongated member and the other of said hinged members pivotally connected to said base, and said hinged members when in the same plane preventing the downward movement of said accelerator pedal; a slidable member mounted on the upper surface of said base plate under said elongated member; means pivotally connecting said rod to said slidable member; a rigid link pivotally connected on its ends to said slidable member and said hinged members; and a helical spring that is at all times in tension connected to said base plate and said slidable member to return said rod, slidable member, and hinged members to a position whereby said accelerator pedal may be freely used when said brake pedal is in a non-actuated position.

8. A brake and accelerator coordinating device for a vehicle powered with an internal combustion engine having an accelerator and a brake pedal which includes: hinged means which when moved to an extended position maintain said accelerator in said vehicle in an idling position; pivotally mounted lever means that are moved by the movement of said brake pedal; means operatively associating said hinged means and lever means that place said hinged means in an extended position when said brake pedal is moved to a braking position; and spring means that return said hinged means to a non-extended position when said brake pedal moves upwardly to a non-braking position.

CHARLES HOWARD RODEBACK.

References Cited in the file of this patent
UNITED STATES PATENTS

| Number | Name | Date |
|---|---|---|
| 1,658,325 | Bragg | Feb. 7, 1928 |
| 1,674,121 | Owens | June 19, 1928 |
| 1,906,699 | Mallison | May 2, 1933 |
| 1,992,644 | Watson | Feb. 26, 1935 |
| 2,065,354 | Streen | Dec. 22, 1936 |
| 2,229,056 | Dick | Jan. 21, 1941 |
| 2,317,935 | Myerson | Apr. 27, 1943 |